(12) United States Patent
Li

(10) Patent No.: US 10,870,137 B2
(45) Date of Patent: Dec. 22, 2020

(54) SHEET CLEANING DEVICE AND METHOD

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventor: Xiaobao Li, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

(*) Notice: Subject to any disclaimer, the term of this patent is extended or adjusted under 35 U.S.C. 154(b) by 141 days.

(21) Appl. No.: 16/041,993

(22) Filed: Jul. 23, 2018

(65) Prior Publication Data

US 2019/0091735 A1  Mar. 28, 2019

(30) Foreign Application Priority Data

Sep. 28, 2017 (CN) .......................... 2017 1 0897594

(51) Int. Cl.
*B08B 3/04* (2006.01)
*B08B 3/02* (2006.01)
*F26B 21/00* (2006.01)
*B08B 3/08* (2006.01)
*G02F 1/1337* (2006.01)
*G02F 1/13* (2006.01)

(52) U.S. Cl.
CPC .............. *B08B 3/041* (2013.01); *B08B 3/022* (2013.01); *B08B 3/08* (2013.01); *F26B 21/004* (2013.01); *G02F 1/1303* (2013.01); *G02F 1/133723* (2013.01)

(58) Field of Classification Search
CPC ....................................................... B08B 3/041
See application file for complete search history.

(56) References Cited

U.S. PATENT DOCUMENTS 5,495,864 A    3/1996  Takagi et al.
2018/0169715 A1  6/2018  Jing

FOREIGN PATENT DOCUMENTS

CN    202124565 U   1/2012
CN    105921431 A   9/2016
EP       104633 A2   4/1984
JP     10211471 A   8/1998

OTHER PUBLICATIONS

First Office Action for Chinese Patent Application No. 201710897594.4 dated Mar. 1, 2019.

*Primary Examiner* — Jason Y Ko
(74) *Attorney, Agent, or Firm* — Calfee, Halter & Griswold LLP

(57) ABSTRACT

A sheet cleaning device and method is provided. The sheet cleaning device includes a soak unit, a cleaning solution cleaning unit, a water cleaning unit, a drying unit, and a conveying member. The soak unit is configured to accommodate a soak solution and a sheet so that the sheet is subjected to static cleaning of the soak solution; the cleaning solution cleaning unit is configured to rinse the sheet with a cleaning solution; the water cleaning unit is configured to rinse the sheet with water; and the drying unit is configured to perform drying treatment to a cleaned sheet. The conveying member is configured to receive a soaked sheet from the soak unit and convey the soaked sheet through the cleaning solution cleaning unit, the water cleaning unit, and the drying unit, in order.

14 Claims, 3 Drawing Sheets

SHEET CLEANING DEVICE AND METHOD

CROSS REFERENCE TO RELATED APPLICATIONS

The present application claims the priority of Chinese patent application No. 201710897594.4 filed on Sep. 28, 2017, the entire disclosure of which is incorporated herein by reference.

TECHNICAL FIELD

The present disclosure relates to the field of cleaning technology, particularly to a sheet cleaning device and method, and more particularly to a transfer sheet cleaning device and method.

BACKGROUND

In an industrial production process such as manufacturing of a liquid crystal display panel, in order to realize mass production of products, it is often necessary to apply a large number of sheets of the same type, and these sheets need to be reused to save the cost. For example, in the manufacturing process of a liquid crystal display panel, it is often necessary to use a plurality of transfer sheets.

Specifically, in order to realize the alignment of liquid crystal molecules, the manufacturing process of a liquid crystal display panel includes an alignment film processing process, and the alignment film processing process includes a printing process of forming a polyimide (PI) film on the surfaces of an array substrate and a color filter substrate, and an alignment process for rubbing the PI film. The printing process generally includes printing a PI film on the surfaces of the array substrate and the color filter substrate by employing a printing machine that includes a transfer sheet. In the printing process, the transfer sheet is coated with PI liquid and brought into contact with a glass substrate for the array substrate or the color filter substrate, so that the PI liquid is coated onto the glass substrate to form the PI film.

In order to make the PI liquid uniformly coated onto the transfer sheet, the transfer sheet is provided with tiny recesses in network-like arrangement to improve the printing quality of the PI film. During the printing process, the transfer sheet and the PI liquid remain in contact for a long time, and the residual PI liquid in the recesses may solidify, which would cause some deficiency in the PI film in the subsequent printing process, resulting in a defective liquid crystal display panel. Therefore, it is necessary to clean the transfer sheet, in particular, to remove the PI liquid which has solidified in the recesses as much as possible.

SUMMARY

A sheet cleaning device according to an embodiment of the present disclosure includes a soak unit configured to accommodate a soak solution and a sheet so that the sheet is subjected to static cleaning by the soak solution; a cleaning solution cleaning unit configured to rinse the sheet with a cleaning solution; a water cleaning unit configured to rinse the sheet with water; and a drying unit configured to perform drying treatment to the sheet after being rinsed. The sheet cleaning device further includes a conveying member configured to receive a soaked sheet from the soak unit, and convey the soaked sheet through the cleaning solution cleaning unit, the water cleaning unit, and the drying unit successively.

The sheet mentioned herein refers to a plate-like member that can be reused or recycled after cleaning in industrial production, and in particular it includes members that need to be cleaned using a cleaning solution. Examples of the sheet mentioned herein include, but are not limited to, a transfer sheet used in the manufacturing process of a liquid crystal display panel.

In an embodiment, the cleaning solution cleaning unit, the water cleaning unit and the drying unit are stacked successively in a vertical direction from bottom to top to form a columnar structure, the cleaning solution cleaning unit, the water cleaning unit, and the drying unit each includes a tank that spirals upwards around a center of the columnar structure, so that the cleaning solution cleaning unit, the water cleaning unit, and the drying unit as a whole exhibit a spiral columnar structure.

Further, in some embodiments, the conveying member includes a guide rail or conveying belt that spirals upwards along a top of the tank of each of the cleaning solution cleaning unit, the water cleaning unit, and the drying unit.

In some embodiments, tanks of the cleaning solution cleaning unit, the water cleaning unit, and the drying unit are independent of each other, and the top of each of the tanks has an opening.

In some embodiments, the soak unit includes a plurality of soak tanks separated from each other, each of the soak tanks being used for accommodating a soak solution and one sheet.

Further, in some embodiments, an ultrasonic generator is disposed in the soak tanks.

In some embodiments, the soak unit further includes an elevating mechanism for raising the soaked sheet from the soak unit to be provided to the cleaning solution cleaning unit.

In some embodiments, the tank of the cleaning solution cleaning unit includes a first high pressure nozzle for spraying the cleaning solution onto the sheet when the sheet passes through the opening of the tank of the cleaning solution cleaning unit.

Further, in some embodiments, the tank of the water cleaning unit includes a second high pressure nozzle for spraying water onto the sheet when the sheet passes through the opening of the tank of the water cleaning unit.

In some embodiments, the cleaning solution cleaning unit and the water cleaning unit each further includes a support plate fixed above the conveying member, the support plate being used for supporting the sheet conveyed by the conveying member to resist an impact force from the first high pressure nozzle or the second high pressure nozzle.

In some embodiments, at least one of the cleaning solution cleaning unit and the water cleaning unit includes a roller brush, the roller brush being fixed below the conveying member so that the sheet is subjected to brushing by the roller brush while being conveyed by the conveying member through the roller brush.

In some embodiments, the drying unit includes blowing members fixed above and below the conveying member.

Examples of the sheet mentioned herein include, but are not limited to, transfer sheets used in the manufacturing process of a liquid crystal display panel, in which case the soak solution and the cleaning solution each includes N-methylpyrrolidone.

In some embodiments, the tanks of the cleaning solution cleaning unit, the water cleaning unit and the drying unit are provided with drainage holes.

Another embodiment of the present disclosure provides a method for cleaning a sheet using the sheet cleaning device as described in the foregoing embodiments, comprising the steps of soaking a sheet in the soak solution in the soak unit to allow the sheet to be subjected to static cleaning by the soak solution; and conveying the soaked sheet using the conveying member through the cleaning solution cleaning unit, the water cleaning unit and the drying unit, successively.

Further, in some embodiments, the cleaning solution cleaning unit, the water cleaning unit and the drying unit are stacked successively in a vertical direction from bottom to top to form a columnar structure. The cleaning solution cleaning unit, the water cleaning unit and the drying unit each includes a tank that spirals upwards around a center of the columnar structure so that the cleaning solution cleaning unit, the water cleaning unit, and the drying unit as a whole exhibit a spiral columnar structure. The top of each tank has an opening. The tank of the cleaning solution cleaning unit includes a first high pressure nozzle for spraying the cleaning solution onto the sheet when the sheet passes through the opening of the tank of the cleaning solution cleaning unit, the tank of the water cleaning unit includes a second high pressure nozzle for spraying water onto the sheet when the sheet passes through the opening of the tank of the water cleaning unit, and the drying unit includes blowing members fixed above and below the conveying member. The method can further include the following steps. In response to the sheet reaching the cleaning solution cleaning unit, the method includes the step of opening the first high pressure nozzle in the cleaning solution cleaning unit. In response to the sheet reaching the water cleaning unit, the method includes the step of opening the second high pressure nozzle in the water cleaning unit. In response to the sheet reaching the drying unit, the method oncludes the step of activating the blowing members.

Some of the embodiments of the present disclosure are briefly summarized above. It will be appreciated by those skilled in the art that the features in the embodiments described above can be combined in various manners to form many other different embodiments.

BRIEF DESCRIPTION OF DRAWINGS

Embodiments of the present disclosure will be described in more detail below by way of non-limiting examples with reference to the accompanying drawings so as to provide a thorough understanding of the principles and spirit of the present disclosure. In the drawings.

DETAILED DESCRIPTION OF EMBODIMENTS

Figure 1:
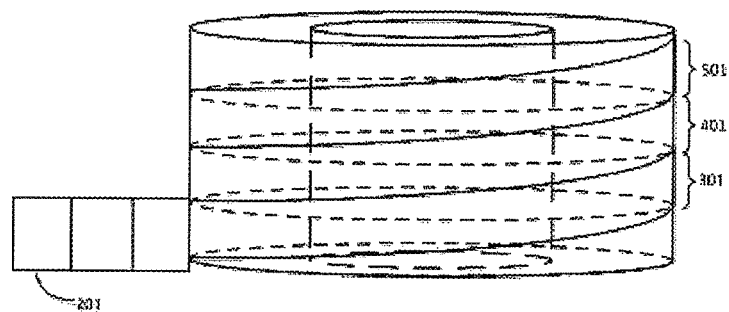
FIG. 1 schematically shows main components of a sheet cleaning device according to an embodiment of the present disclosure.

Some embodiments of the present disclosure will now be described in detail by way of examples, examples of which are illustrated in the accompanying drawings. Wherever possible, the same reference numerals are used in the drawings and the description to refer to the same or like parts. Those skilled in the art can understand that the embodiments described below are merely some of possible embodiments of the present disclosure rather than all of them. Other embodiments obtained by making obvious modifications or variations to the embodiments provided herein under the guidance of the technical concepts disclosed herein also fall within the scope of the present disclosure.

FIG. 1 schematically shows the main components of a sheet cleaning device according to an embodiment of the present disclosure. As shown in FIG. 1, the sheet cleaning device includes a soak unit 201, a cleaning solution cleaning unit 301, a water cleaning unit 401, and a drying unit 501. The soak unit 201 is configured to accommodate a soak solution and a sheet so that the sheet is subjected to static cleaning by the soak solution. The cleaning solution cleaning unit 301 is configured to rinse the sheet with a cleaning solution. The water cleaning unit 401 is configured to rinse the sheet with water. And the drying unit 501 is configured to perform drying treatment to the sheet after rinsed. The sheet cleaning device further includes a conveying member (not shown in FIG. 1) configured to receive the soaked sheet from the soak unit and convey the soaked sheet through the cleaning solution cleaning unit, the water cleaning unit, and the drying unit, successively.

With the sheet cleaning device provided by the embodiment of the present disclosure, the sheet can be subjected to static cleaning by the soak solution in the soak unit. At that time, the soak solution can remove a part of impurities or contaminants on the sheet surface, or the soak solution may chemically react with contaminants or impurities on the sheet surface to facilitate the complete removal of these contaminants or impurities during the subsequent cleaning process. When the sheet is conveyed from the soak unit to the cleaning solution cleaning unit, the process of rinsing the sheet with the cleaning solution can remove most of the original contaminants on the sheet surface or new substances generated from the chemical reaction of the soak solution with the contaminants on the sheet surface. Next, rinsing the sheet by the water cleaning unit with water can further remove residual contaminants and impurities on the sheet surface. Therefore, a plurality of sheets can be successively conveyed by the conveying member through the cleaning solution cleaning unit, the water cleaning unit and the drying unit, and continuous cleaning to multiple sheets can be achieved. As a result, the sheet cleaning efficiency is greatly improved compared to the existing sheet cleaning device.

The sheet mentioned herein refers to plate-like members that can be reused or recycled after cleaning in industrial production, which particularly include those members that need to be cleaned using a cleaning solution. Therefore, examples of the sheet include, but are not limited to, a transfer sheet used in the manufacturing process of a liquid crystal display panel. Accordingly, when the sheet cleaning device proposed by the embodiment of the present disclosure is used to clean a sheet, the soak solution or the cleaning solution can be selected depending on the sheet to be cleaned. The compositions of the soak solution and the cleaning solution are not limited in the present disclosure. In an embodiment where the sheet to be cleaned is a transfer sheet used in the manufacturing process of a liquid crystal display panel, the soak solution and the cleaning solution may each include N-methylpyrrolidone. Of course, in addition to N-methylpyrrolidone, the soak solution and the cleaning solution may also include other ingredients that may facilitate cleaning of the transfer sheet.

In an embodiment of the present disclosure, as shown in FIG. 1, the cleaning solution cleaning unit 301, the water cleaning unit 401, and the drying unit 501 are stacked successively in a vertical direction from the bottom to the top to form a columnar structure. The cleaning solution cleaning unit 301, the water cleaning unit 401, and the drying unit 501 each include a tank that spirals upwards around the center of the columnar structure, so that the cleaning solution cleaning unit, the water cleaning unit, and the drying unit as a whole exhibit a spiral columnar structure. The tanks of the cleaning solution cleaning unit 301, the water cleaning unit 401, and the drying unit 501 will be specifically described below. It can be understood that, the cleaning solution cleaning unit 301, the water cleaning unit 401, and the drying unit 501 included in the sheet cleaning device are designed as a stacked column structure, so these three units will only need to occupy the area of one unit on the ground, which is beneficial to reducing the overall area occupied by the sheet cleaning device. Further, since the cleaning solution cleaning unit 301, the water cleaning unit 401, and the drying unit 501 each includes a tank that spirals upwards around the center of the columnar structure, by means of the conveying member, the sheet can move upwards along the top of the tank of respective units to pass through the cleaning solution cleaning unit 301, the water cleaning unit 401, and the drying unit 501 in sequence. In this way, the sheet can pass through the cleaning solution cleaning unit 301, the water cleaning unit 401 and the drying unit 501 successively at a low cost and highly efficient way.

Of course, in other embodiments, the cleaning solution cleaning unit, the water cleaning unit, and the drying unit may be combined into structures having other profiles, for example, they may be arranged on the same horizontal plane. Therefore, the scope of the present disclosure is not limited to the example shown in the drawings.

FIG. 1 schematically shows a spiral columnar profile composed of the cleaning solution cleaning unit 301, the water cleaning unit 401, and the drying unit 501. In some embodiments, the above spiral columnar structure has an upwardly spirally inclined angle between 10° and 20°. That is, the top of the tank of each of the cleaning solution cleaning unit, the water cleaning unit, and the drying unit has an upwardly inclined angle between 10° and 20°. In this way, during the processes of rinsing the sheet with the cleaning solution and rinsing the sheet with water, the cleaning solution and water can flow down quickly along the sheet surface. In addition, the above units can be prevented from occupying a large space in the vertical direction.

The conveying member that can be applied to the sheet cleaning device according to the embodiment of the present disclosure may be in any suitable form as long as it can convey the sheet through the cleaning solution cleaning unit, the water cleaning unit, and the drying unit successively. In some embodiments, since the cleaning solution cleaning unit, the water cleaning unit, and the drying unit each includes a tank that spirals upwards around the center of the columnar structure, the conveying member accordingly includes a guide rail or conveying belt that spirals upwards along the top of the tank of each of the cleaning solution cleaning unit, the water cleaning unit and the drying unit. The guide rail may be in the form of a single rail or a double rail, and the sheet may be temporarily fixed on the guide rail in any suitable manner such that it moves with the guide rail to pass through the tanks of the cleaning solution cleaning unit, the water cleaning unit and the drying unit successively. In an example in which a belt-shaped conveying belt is employed as the conveying member, the sheet can be temporarily fixed on the surface of the conveying belt facing the tanks of the cleaning solution cleaning unit, the water cleaning unit, and the drying unit. After drying treatment performed by the drying unit, the sheet can be removed from the guide rail or the conveying belt.

The main structures of the tanks of the cleaning solution cleaning unit, the water cleaning unit and the drying unit, as well as the conveying member will be described below by way of example.

Figure 2:
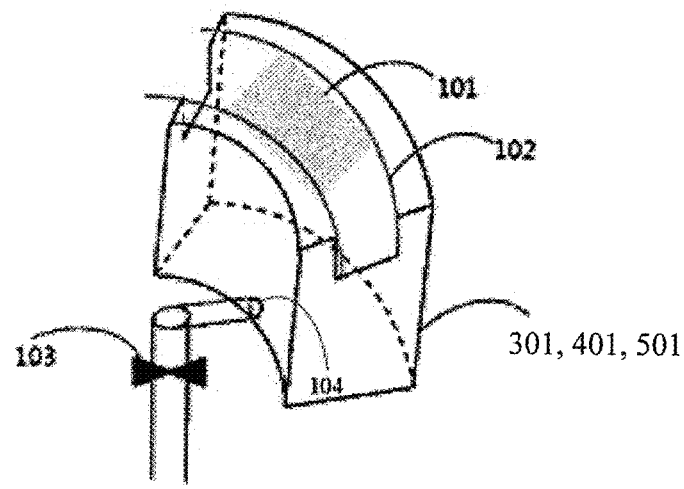
FIG. 2 is a partial perspective view schematically showing a tank of a respective unit and a guide rail at the top of the tank in the sheet cleaning device according to an embodiment of the present disclosure.
Figure 3:
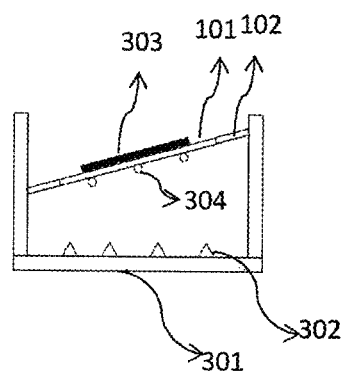
FIG. 3 schematically shows a circumstance in which a sheet is conveyed by a conveying member through a cleaning solution cleaning unit or a water cleaning unit according to an embodiment of the present disclosure.
Figure 4:
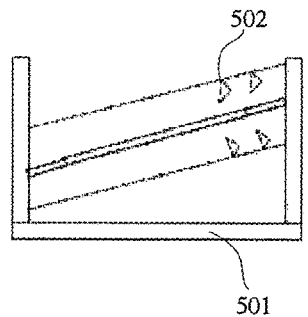
FIG. 4 schematically shows a circumstance in which a sheet is conveyed by a conveying member through a drying unit according to an embodiment of the present disclosure.

In order to clearly show the spiral tanks of the cleaning solution cleaning unit, the water cleaning unit and the drying unit as well as the guide rail or conveying belt above the tanks, FIG. 2 schematically shows a partial perspective view of the spiral tanks of the cleaning solution cleaning unit, the water cleaning unit or the drying unit and the guide rail. FIGS. 3 and 4 schematically show a circumstance in which a sheet passes through the cleaning solution cleaning unit, the water cleaning unit and the drying unit, respectively. It is to be noted that, for the sake of simplicity, the tanks in FIGS. 3 and 4 are not drawn as a shape that spirals upwards. FIGS. 3 and 4 are only used for illustrating the main structures of the cleaning solution cleaning unit, the water cleaning unit or the drying unit. Therefore, the shapes of the tanks shown in FIGS. 3 and 4 do not limit the scope of the present disclosure.

In an embodiment of the present disclosure, the tanks of the cleaning solution cleaning unit, the water cleaning unit, and the drying unit are independent of each other, and the top of each tank has an opening. That is, the tanks of the cleaning solution cleaning unit, the water cleaning unit and the drying unit do not affect each other, and the liquid or structure placed within the tank of each unit does not affect the operation of other units. When the sheet is carried by the conveying member to pass through the opening of the tank of the cleaning solution cleaning unit or the water cleaning unit, the cleaning solution or water in a corresponding tank can be sprayed onto the surface of the sheet to be cleaned, realizing rinsing of the sheet. FIG. 2 schematically shows a guide rail 102 and a sheet 101 conveyed by the guide rail 102. In the example of FIG. 2, the guide rail 102 is of a double-rail structure.

As shown in FIG. 3, the tank of the cleaning solution cleaning unit 301 includes a first high pressure nozzle 302 for spraying the cleaning solution onto the sheet when the sheet passes through the opening of the tank of the cleaning solution cleaning unit. The water cleaning unit 401 may have a structure similar to that of the cleaning solution cleaning unit 301. That is, the tank of the water cleaning unit includes a second high pressure nozzle for spraying water onto the sheet when the sheet passes through the opening of the tank of the water cleaning unit. For the sake of brevity, the water cleaning unit is not shown here. The cleaning solution cleaning unit and the water cleaning unit may each have a storage device for storing the cleaning solution or water. When the first high pressure nozzle or the second high pressure nozzle is turned on, the cleaning solution and water may be sprayed onto the surface of the sheet to be cleaned, realizing rinsing of the sheet with the cleaning solution and water.

In some embodiments, as shown in FIG. 3, the cleaning solution cleaning unit and the water cleaning unit may each further include a support plate 303 fixed above the conveying member, and the support plate 303 can support the sheet 101 conveyed by the conveying member to resist an impact force from the first high pressure nozzle 302 or the second high pressure nozzle. When the sheet is being rinsed with the cleaning solution or water, the first high pressure nozzle and the second high pressure nozzle may produce a large impact force on the sheet, and such an impact force may cause the sheet to be deformed. Therefore, the support plate 303 can provide the sheet on the guide rail with a support force against the impact force, thereby protecting the sheet from damage. In some embodiments, the support plate 303 may be fixed above the guide rail 102 by means of a cross beam, and the support plate 303 may be disposed at an appropriate distance from the guide rail 102 so that the support plate 303 does not obstruct the movement of sheet 101 when the sheet 101 is transported by the guide rail, while being close enough to the sheet 101 (which may be in contact with the sheet 101) to provide support force for the sheet 101.

In yet another embodiment of the present disclosure, at least one of the cleaning solution cleaning unit and the water cleaning unit includes a roller brush. As shown in FIG. 3, a roller brush 304 is fixed below the conveying member 102 so that the sheet 101 is subjected to brushing by the roller brush while being conveyed by the conveying member through the roller brush 304. Specific forms of the roller brush include, but are not limited to, a hair brush. The roller brush can be fixed to the walls of a corresponding tank. It can be understood that, being brushed by the roller brush, the sheet can be further cleaned. This is particularly advantageous to cleaning of a sheet with a non-smooth surface. For example, in an example where the sheet 101 is a transfer sheet, the roller brush 304 can effectively remove the PI liquid or particles within the recesses of the transfer sheet, as well as other contaminants or impurities.

In an embodiment of the present disclosure, the tank of each of the cleaning solution cleaning unit, the water cleaning unit, and the drying unit may further include a drainage system, respectively. As shown in FIG. 2, the bottom of the tank of each cleaning unit may be provided with a drainage hole 104. When a certain amount of liquid accumulates in a corresponding tank, a valve 103 can be turned on to discharge the liquid in the tank.

FIG. 4 schematically shows a circumstance in which a sheet is conveyed through the drying unit. As shown in FIG. 4, a drying unit 501 includes blowing members 502 fixed above and below the conveying member. Examples of the blowing member 502 include, but are not limited to, a high pressure air knife, which can blow off the remaining liquid on the transfer sheet. Further, the drying unit 501 may further include a temperature control unit that controls the temperature in the tank of the drying unit above a certain temperature (for example, 50 degrees Celsius) so as to facilitate the evaporation of water and ensure the drying effect for the sheet.

According to some embodiments of the present disclosure, the soak unit includes a plurality of soak tanks separated from each other, each of which is used for accommodating the soak solution and one sheet. For example, FIG. 1 schematically shows that the soak unit includes a plurality of soak tanks separated from each other. The soak solution and one sheet can be placed in each soak tank, so that multiple sheets can be immersed in the plurality of soak tanks respectively, and subjected to static cleaning by the soak solution. Moreover, cross-contamination will not take place between different sheets.

Figure 5:
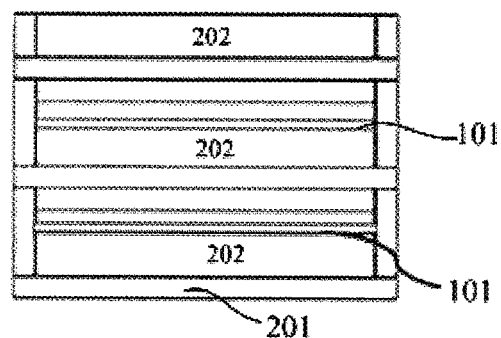
FIG. 5 schematically shows a partial structure of a soak unit of the sheet cleaning device according to an embodiment of the present disclosure.

Alternatively, the soak unit 201 may also be designed to include a plurality of stacked soak tanks as shown in FIG. 5, each of which is used for accommodating a soak solution 202. The sheet 101 may be placed in the soak solution 202 in each layer to be subjected to static cleaning.

In a further embodiment, an ultrasonic generator may be further disposed in the soak tank of the soak unit. Ultrasonic waves from the ultrasonic generator can facilitate the removal of contaminants or impurities on the surface of the sheet, thereby further enhancing the cleaning effect of the sheet.

Figure 6:
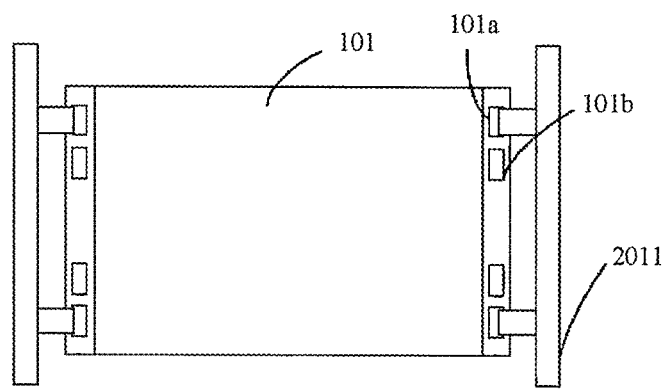
FIG. 6 is used to illustrate an elevating mechanism in the soak unit of the sheet cleaning device according to an embodiment of the present disclosure.

In order to facilitate the transfer of the soaked sheet to the conveying member of the device, in some embodiments, the soak unit further includes an elevating mechanism for raising the soaked sheet from the soak unit to be provided to the cleaning solution cleaning unit. FIG. 6 schematically shows an elevating mechanism 2011 and a sheet 101 fixed on the elevating mechanism. As shown in FIG. 6, in this embodiment, the sheet itself may be provided with a first through hole 101a and a second through hole 101b, and the sheet 101 may be fixed to the elevating mechanism via the first through hole 101a. The second through hole 101b may be used to couple with the conveying member to temporarily fix the sheet 101 to the conveying member. For example, the guide rail of the conveying member may be provided with a bump, and the second through hole 101b of the sheet may be matched with the bump on the guide rail. That is, the bump is passed through the second through hole 101b, so that the sheet 101 can be stably placed on the guide rail and easily conveyed by the conveying member.

Figure 7:
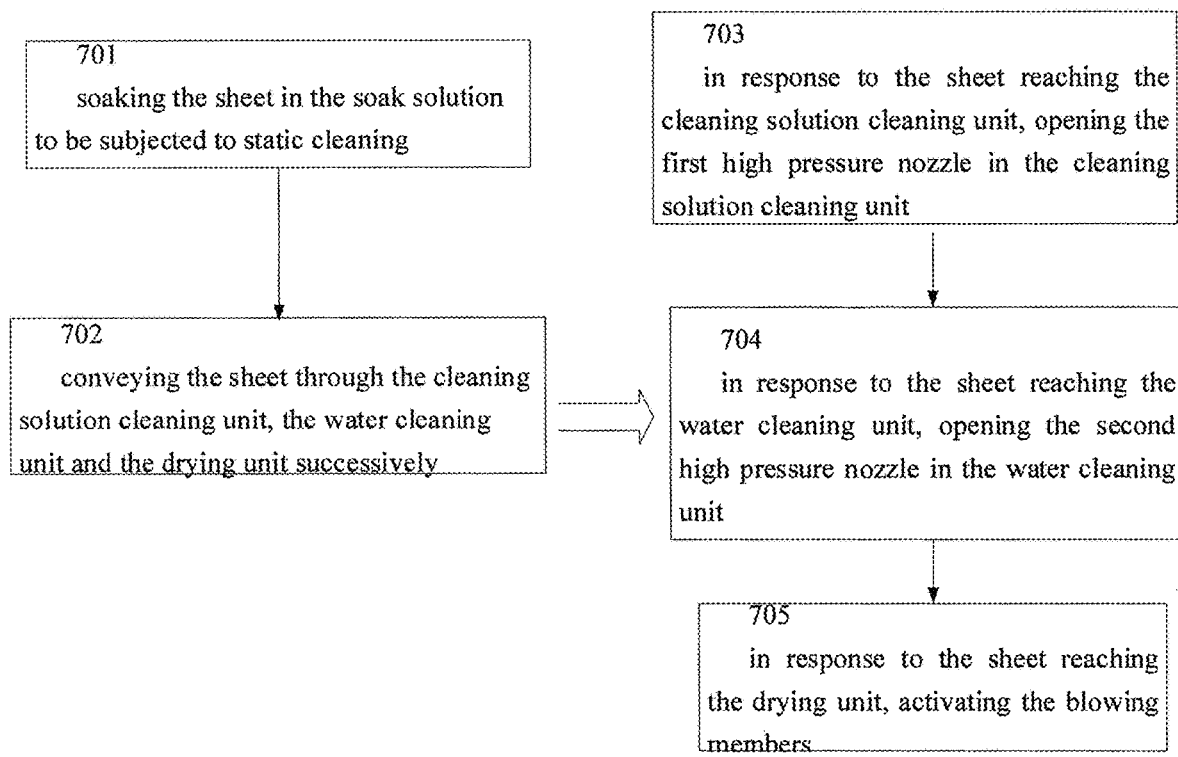
FIG. 7 shows the main process of cleaning a sheet using the sheet cleaning device provided by an embodiment of the present disclosure.

Yet another embodiment of the present disclosure provides a method for cleaning a sheet, which method can be used for the sheet cleaning device described in any of the foregoing embodiments. As shown in FIG. 7, a method according to an embodiment of the present disclosure may include the following steps: soaking a plurality of sheets in the soak solution in the soak unit to allow the sheet to be subjected to static cleaning by the soak solution 701; and conveying the soaked sheet using a conveying member through the cleaning solution cleaning unit, the water cleaning unit, and the drying unit successively 702.

Further, in an embodiment, the cleaning solution cleaning unit, the water cleaning unit, and the drying unit of the sheet cleaning device are stacked successively in a vertical direction from bottom to top to form a columnar structure. The cleaning solution cleaning unit, the water cleaning unit, and the drying unit each include a tank that spirals upwards around the center of the columnar structure, so that the cleaning solution cleaning unit, the water cleaning unit, and the drying unit as a whole exhibit a spiral columnar structure. The top of each tank has an opening. The tank of the cleaning solution cleaning unit includes a first high pressure nozzle for spraying the cleaning solution onto the sheet when the sheet passes through the opening of the tank of the cleaning solution cleaning unit. The tank of the water cleaning unit includes a second high pressure nozzle for spraying water onto the sheet when the sheet passes through the opening of the tank of the water cleaning unit. In this embodiment, the method further includes opening the first high pressure nozzle in the cleaning solution cleaning unit in response to the sheet reaching the cleaning solution cleaning unit 703; and opening the second high pressure nozzle in the water cleaning unit in response to the sheet reaching the water cleaning unit 704.

As previously described, in some embodiments, the drying unit includes blowing members fixed above and below the conveying member, in which case the method further includes activating the blowing members in response to the sheet reaching the drying unit 705.

As previously described, the sheets mentioned herein refers to plate-like members that can be reused or recycled after cleaning in industrial production, and particularly include those sheets that need to be cleaned using a cleaning solution. Although embodiments of the present disclosure have mentioned cleaning of a transfer sheet, the principles revealed by the embodiments of the present disclosure can be applied to cleaning of other sheets. Therefore, the protection scope of the present disclosure is not limited to the cleaning device for cleaning a transfer sheet.

Although some exemplary embodiments of the present disclosure have been described in detail above, those skilled in the art can understand and implement other variants of the disclosed embodiments based on the studies on the drawings, the disclosure and the claims when practicing the claimed disclosure. In the claims, the word "comprising" does not exclude the presence of other elements. Although some features are recited in different dependent claims, the present disclosure is also intended to cover embodiments in which these features are combined.

The invention claimed is:

1. A sheet cleaning device comprising:
   a soak unit configured to accommodate a soak solution and a sheet such that the sheet is subjected to static cleaning by the soak solution,
   a cleaning solution cleaning unit configured to rinse the sheet with a cleaning solution,
   a water cleaning unit configured to rinse the sheet with water, and
   a drying unit configured to perform a drying treatment to the sheet after rinsing,
   wherein the sheet cleaning device further comprises a conveying member, which is configured to receive a soaked sheet from the soak unit, and convey the soaked sheet through the cleaning solution cleaning unit, the water cleaning unit, and the drying unit, successively,
   wherein the cleaning solution cleaning unit, the water cleaning unit and the drying unit are stacked successively in a vertical direction from bottom to top to form a columnar structure, each of the cleaning solution cleaning unit, the water cleaning unit, and the drying unit comprising a tank that spirals upwards around a center of the columnar structure, such that the cleaning solution cleaning unit, the water cleaning unit, and the drying unit as a whole exhibit a spiral columnar structure.

2. The sheet cleaning device according to claim 1, wherein the conveying member comprises one of a guide rail or conveying belt that spirals upwards along a top of the tank of each of the cleaning solution cleaning unit, the water cleaning unit, and the drying unit.

3. The sheet cleaning device according to claim 1, wherein the sheet further comprises a transfer sheet.

4. The sheet cleaning device according to claim 2, wherein tanks of the cleaning solution cleaning unit, the water cleaning unit, and the drying unit are independent of each other, and the top of each of the tanks comprises an opening.

5. The sheet cleaning device according to claim 4, wherein the soak unit comprises a plurality of soak tanks, wherein each of the plurality of soak tanks is separate from each other, and each of the plurality of soak tanks is used for accommodating the soak solution and the sheet.

6. The sheet cleaning device according to claim 5, wherein an ultrasonic generator is disposed in the plurality of soak tanks.

7. The sheet cleaning device according to claim 5, wherein the soak unit further comprises an elevating mechanism for raising the sheet from the soak unit to be provided to the cleaning solution cleaning unit.

8. The sheet cleaning device according to claim 4, wherein the tank of the cleaning solution cleaning unit includes a first high pressure nozzle for spraying the cleaning solution onto the sheet when the sheet passes through the opening of the tank of the cleaning solution cleaning unit.

9. The sheet cleaning device according to claim 8, wherein the tank of the water cleaning unit includes a second high pressure nozzle for spraying water onto the sheet when the sheet passes through the opening of the tank of the water cleaning unit.

10. The sheet cleaning device according to claim 9, wherein the cleaning solution cleaning unit and the water cleaning unit each further comprises a support plate fixed above the conveying member, the support plate being used for supporting the sheet conveyed by the conveying member to resist an impact force from the first high pressure nozzle or the second high pressure nozzle.

11. The sheet cleaning device according to claim 10, wherein at least one of the cleaning solution cleaning unit and the water cleaning unit includes a roller brush, the roller brush being fixed below the conveying member so that the sheet is subjected to brushing by the roller brush while being conveyed by the conveying member through the roller brush.

12. The sheet cleaning device according to claim 10, wherein the drying unit includes blowing members fixed above and below the conveying member.

13. A method for cleaning a sheet using the sheet cleaning device according to claim 1, comprising:
    soaking the sheet in the soak solution in the soak unit to allow the sheet to be subjected to static cleaning by the soak solution, and
    conveying the sheet using the conveying member successively through the cleaning solution cleaning unit, the water cleaning unit and the drying unit successively.

14. The method according to claim 13, wherein the cleaning solution cleaning unit, the water cleaning unit and the drying unit are stacked successively in a vertical direction from bottom to top to form a columnar structure, the cleaning solution cleaning unit, the water cleaning unit and the drying unit each comprise a tank that spirals upwards around a center of the columnar structure so that the cleaning solution cleaning unit, the water cleaning unit, and the drying unit as a whole exhibit a spiral columnar structure, a top of each tank has an opening, the tank of the cleaning solution cleaning unit comprises a first high pressure nozzle for spraying the cleaning solution onto the sheet when the sheet passes through the opening of the tank of the cleaning solution cleaning unit, the tank of the water cleaning unit comprises a second high pressure nozzle for spraying water onto the sheet when the sheet passes through the opening of the tank of the water cleaning unit, and the drying unit comprises blowing members fixed above and below the conveying member, wherein the method further comprises:

opening the first high pressure nozzle in the cleaning solution cleaning unit in response to the sheet reaching the cleaning solution cleaning unit, opening the second high pressure nozzle in the water cleaning unit in response to the sheet reaching the water cleaning unit, and activating the blowing members in response to the sheet reaching the drying unit.

\* \* \* \* \*